United States Patent
Krishnan et al.

(10) Patent No.: US 10,189,429 B2
(45) Date of Patent: Jan. 29, 2019

(54) VEHICLE SENSOR CLEANING BASED ON A VEHICLE OCCUPANCY STATUS

(71) Applicant: Ford Global Technologies, LLC, Dearborn, MI (US)

(72) Inventors: Venkatesh Krishnan, Canton, MI (US); Segundo Baldovino, Novi, MI (US); Andre Sykula, Sterling Heights, MI (US); Clay Wesley Maranville, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/633,325

(22) Filed: Jun. 26, 2017

(65) Prior Publication Data

US 2018/0370474 A1 Dec. 27, 2018

(51) Int. Cl.
*B60H 1/32* (2006.01)
*B60N 2/00* (2006.01)
*B60G 13/14* (2006.01)
*B60R 21/015* (2006.01)
*B60H 3/06* (2006.01)

(52) U.S. Cl.
CPC ........ *B60R 21/01526* (2014.10); *B60G 13/14* (2013.01); *B60H 1/3216* (2013.01); *B60H 1/3229* (2013.01); *B60H 3/06* (2013.01); *B60H 1/3208* (2013.01); *B60H 2001/3266* (2013.01); *B60N 2/002* (2013.01); *B60R 21/01538* (2014.10)

(58) Field of Classification Search
None
See application file for complete search history.

(56) References Cited

U.S. PATENT DOCUMENTS

| | | | |
|---|---|---|---|
| 4,248,383 A | 2/1981 | Savage et al. | |
| 5,708,859 A | 1/1998 | Tajima et al. | |
| 7,783,400 B1 * | 8/2010 | Zimler | B60S 1/0866 219/202 |
| 9,505,382 B2 | 11/2016 | Gokan | |
| 9,539,988 B2 | 1/2017 | Hsiao et al. | |

(Continued)

FOREIGN PATENT DOCUMENTS

| | | |
|---|---|---|
| CN | 201169252 Y | 12/2008 |
| CN | 106232437 A | 12/2016 |
| JP | 2015137070 A | 7/2015 |

OTHER PUBLICATIONS

GB Search Report dated Nov. 15, 2018 re GB Appl. No. 1810379.6.

*Primary Examiner* — Navid Ziaeianmehdizadeh
(74) *Attorney, Agent, or Firm* — Frank A. MacKenzie; Bejin Bieneman PLC

(57) ABSTRACT

A vehicle includes a compressor; a first accumulator fluidly connected with the compressor; a second accumulator fluidly connected with the compressor; a first nozzle directed at a first sensor and fluidly connected with the first accumulator; a second nozzle directed at a second sensor and fluidly connected with the second accumulator; an occupancy sensor; and a computer in communication with the compressor, the accumulators, and the occupancy sensor. The computer is programmed to, upon determining that the vehicle is unoccupied based on data received from the occupancy sensor, instruct the compressor to pressurize the accumulators of the vehicle.

18 Claims, 5 Drawing Sheets

(56) References Cited

U.S. PATENT DOCUMENTS

| | | |
|---|---|---|
| 2013/0092758 A1 | 4/2013 | Tanaka et al. |
| 2015/0177512 A1* | 6/2015 | Hayakawa ................ B60S 1/56 |
| | | 348/148 |
| 2015/0183406 A1 | 7/2015 | Tanaka et al. |
| 2015/0203076 A1 | 7/2015 | Irie et al. |
| 2015/0266357 A1 | 9/2015 | Bidner et al. |
| 2016/0001330 A1* | 1/2016 | Romack .................... B08B 3/02 |
| | | 134/18 |
| 2016/0297350 A1* | 10/2016 | Jones ................... B60Q 1/0005 |
| 2016/0362195 A1* | 12/2016 | Wilkinson ................ B64F 1/28 |
| 2017/0210353 A1* | 7/2017 | Stauffer ................. H04W 4/70 |
| 2017/0297537 A1* | 10/2017 | Yako ...................... B60N 2/90 |
| 2018/0015908 A1* | 1/2018 | Rice .......................... B60S 1/56 |

* cited by examiner

VEHICLE SENSOR CLEANING BASED ON A VEHICLE OCCUPANCY STATUS

BACKGROUND

A vehicle, such as an autonomous or semi-autonomous vehicle, typically includes sensors. Some sensors provide data about operation of the vehicle, for example, wheel speed, wheel orientation, and engine and transmission data (e.g., temperature, fuel consumption, etc.). Some sensors detect the position or orientation of the vehicle. For example, the sensors may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world. For example, the sensors may include radar sensors, scanning laser range finders, light detection and ranging (LIDAR) devices, and image processing sensors such as cameras. The sensors may include communications devices, for example, vehicle-to-infrastructure (V2I) or vehicle-to-vehicle (V2V) devices.

The sensors that are placed externally on the vehicle are exposed to an external environment. The sensors may be obstructed by dirt, dust, debris, precipitation, insects, etc. Obstructions can degrade the performance of the sensors. Cleaning systems using compressed gas can store a finite amount of the compressed gas for cleaning at a time, and running a compressor to generate more compressed gas can be noisy and unpleasant to occupants of the vehicle.

DETAILED DESCRIPTION

Figure 1:
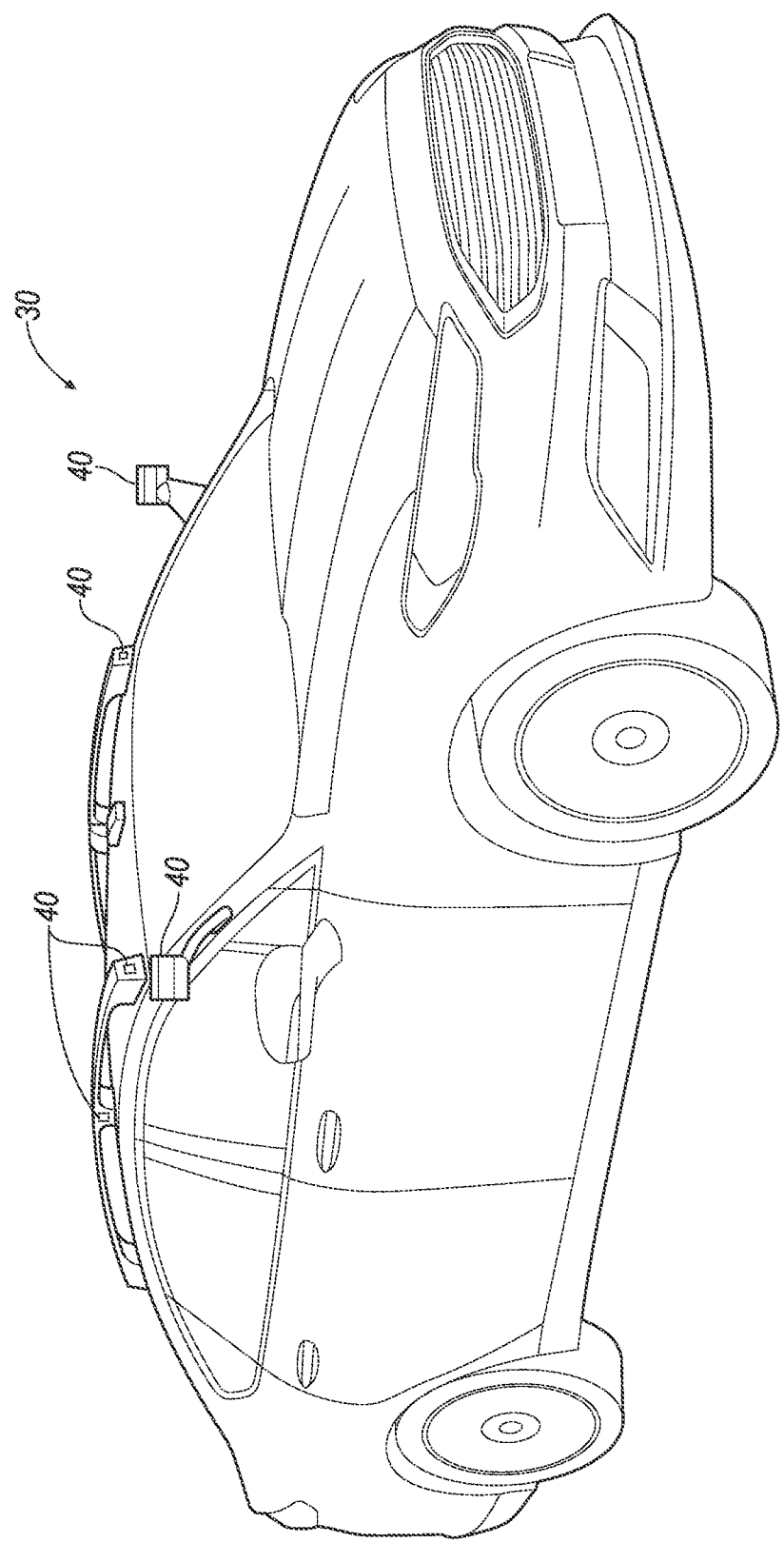
FIG. 1 is a perspective view of an example vehicle.

The cleaning system provides a solution to clean external sensors of a vehicle using compressed air, and to efficiently use the compressed gas to minimize noisiness or unpleasantness for occupants of the vehicle. The cleaning system includes a compressor and a plurality of accumulators connected to nozzles aimed at the external sensors. According to determinations based on data from an occupancy sensor, the cleaning system can refill the accumulators using the compressor more frequently when the vehicle is unoccupied and less frequently when the vehicle is occupied. The cleaning system thus cleans the external sensors while minimizing discomfort for occupants.

A computer is programmed to, upon determining that a vehicle is unoccupied, instruct a compressor to pressurize an accumulator of the vehicle.

The computer may be further programmed to, upon determining that the vehicle is occupied and that the accumulator is below a threshold pressure, instruct the compressor to pressurize the accumulator. The computer may be further programmed to, upon determining that the vehicle is occupied, that an estimated duration for the vehicle to travel to a preset destination is below a threshold time, and that the accumulator is below the threshold pressure, instruct the compressor to remain idle. The computer may be further programmed to, upon determining that the vehicle is occupied and that the accumulator is above the threshold pressure, instruct the compressor to remain idle.

The computer may be further programmed to, upon determining that an estimated distance for the vehicle to travel to a preset destination is below a threshold distance and that the accumulator is below the threshold pressure, instruct the compressor to remain idle. The computer may be programmed to upon determining that the vehicle is occupied and that the accumulator is above the threshold pressure, instruct the compressor to remain idle.

The computer may be further programmed to, upon determining that obstruction of a sensor exceeds an obstruction threshold, instruct the accumulator to vent air through a nozzle directed at the sensor.

The accumulator may be a first accumulator, and the computer may be further programmed to, upon determining that no occupants are present in a vehicle, instruct the compressor to pressurize a second accumulator of the vehicle.

The computer may be further programmed to, upon determining that the vehicle is unoccupied and that the accumulator is below a maximum pressure, instruct the compressor to pressurize the accumulator.

A method includes, upon determining that a vehicle is unoccupied, instructing a compressor to pressurize an accumulator of the vehicle.

The method may include, upon determining that the vehicle is occupied and that the accumulator is below a threshold pressure, instructing the compressor to pressurize the accumulator. The method may include, upon determining that the vehicle is occupied, that an estimated duration for the vehicle to travel to a preset destination is below a threshold time, and that the accumulator is below the threshold pressure, instructing the compressor to remain idle. The method may include, upon determining that the vehicle is occupied and that the accumulator is above the threshold pressure, instructing the compressor to remain idle.

The method may include, upon determining that an estimated distance for the vehicle to travel to a preset destination is below a threshold distance and that the accumulator is below the threshold pressure, instructing the compressor to remain idle. The method may include, upon determining that the vehicle is occupied and that the accumulator is above the threshold pressure, instructing the compressor to remain idle.

The method may include, upon determining that obstruction of a sensor exceeds an obstruction threshold, instructing the accumulator to vent air through a nozzle directed at the sensor.

The accumulator may be a first accumulator, and the method may include, upon determining that no occupants are present in a vehicle, instructing the compressor to pressurize a second accumulator of the vehicle.

The method may include, upon determining that the vehicle is unoccupied and that the accumulator is below a maximum pressure, instructing the compressor to pressurize the accumulator.

A vehicle includes a compressor; a first accumulator fluidly connected with the compressor; a second accumulator fluidly connected with the compressor; a first nozzle directed at a first sensor and fluidly connected with the first accumulator; a second nozzle directed at a second sensor and fluidly connected with the second accumulator; an occupancy sensor; and a computer in communication with the compressor, the accumulators, and the occupancy sensor.

The computer may be programmed to, upon determining that the vehicle is unoccupied based on data received from the occupancy sensor, instruct the compressor to pressurize the accumulators of the vehicle.

With reference to FIG. 1, a vehicle 30 may be an autonomous, semi-autonomous, or nonautonomous vehicle. A computer 32 can be configured to operate the vehicle 30 independently of the intervention of a human driver, completely or to a lesser degree. The computer 32 may be programmed to operate the propulsion, brake system, steering, and/or other vehicle systems. For the purposes of this disclosure, autonomous operation means the computer 32 controls the propulsion, brake system, and steering; semi-autonomous operation means the computer 32 controls one or two of the propulsion, brake system, and steering and a human driver controls the remainder; and nonautonomous operation means the human driver controls the propulsion, brake system, and steering.

Figure 2:
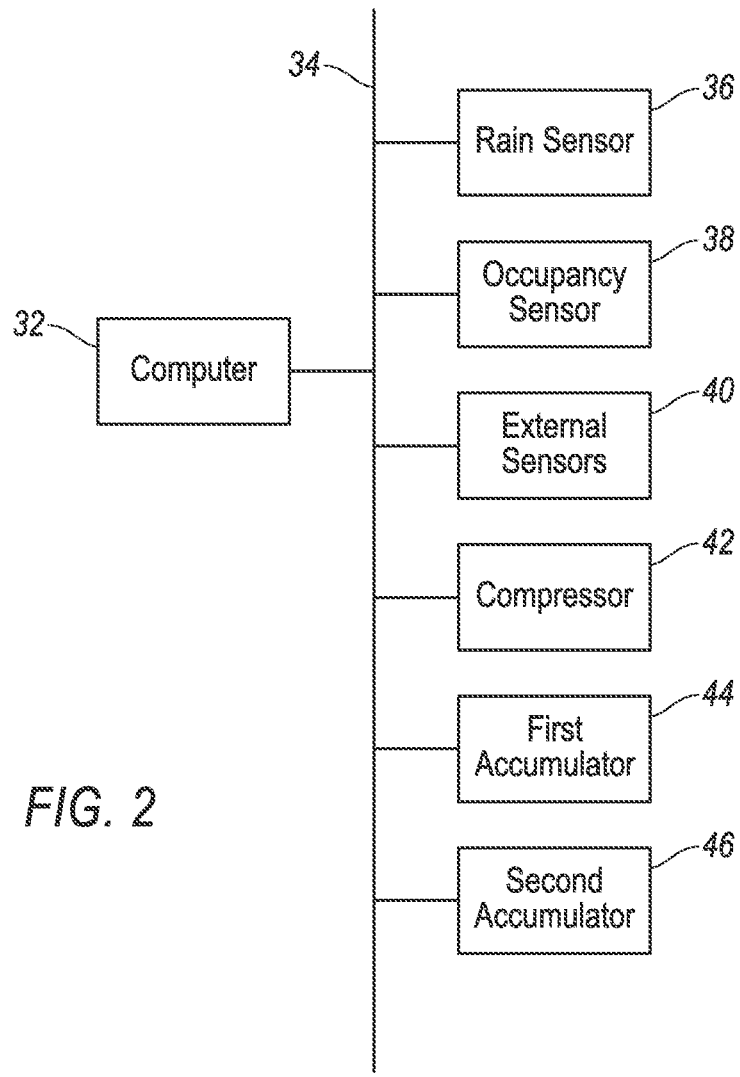
FIG. 2 is a block diagram of an example control system of the vehicle.

With reference to FIG. 2, the computer 32 is a microprocessor-based computer. The computer 32 includes a processor, memory, etc. The memory of the computer 32 includes memory for storing instructions executable by the processor as well as for electronically storing data and/or databases. The computer 32 may be a single computer or may be multiple computers in communication.

The computer 32 may transmit signals through a communications network 34 such as a controller area network (CAN) bus, Ethernet, WiFi, Local Interconnect Network (LIN), onboard diagnostics connector (OBD-II), and/or by any other wired or wireless communications network. The computer 32 may be in communication with a rain sensor 36, an occupancy sensor 38, external sensors 40, a compressor 42, and accumulators 44, 46.

The vehicle 30 may include the rain sensor 36. The rain sensor 36 can be any sensor configured to detect precipitation. For example, the rain sensor 36 may be a piezoelectric sensor coupled to the windshield to detect vibrations from, e.g., precipitation. Vibration data such as amplitude and frequency may be associated with, e.g., types of precipitation such as rain or hail. Alternatively, the rain sensor 36 may be positioned where water from rain will pool and configured to detect such water. For example, the rain sensor 36 may include two electrical leads that, when connected, close a circuit; when water is present between the leads, the conductivity of water changes allows current to flow or changes how much current is flowing by a known amount. For another example, the rain sensor 36 may include an LED bulb, a light sensor, and possibly a prism reflecting light from the LED bulb to the light sensor; the presence of water scatters some of the light, reducing the light received by the light sensor by a known amount.

With continued reference to FIG. 2, the vehicle 30 includes the occupancy sensor 38 configured to detect occupancy of a passenger cabin of the vehicle 30. The occupancy sensor 38 may be a visible-light or infrared camera directed at seats in the passenger cabin, weight sensors inside the seats, sensors detecting whether a seatbelt for any of the seats is buckled or unspooled, or other suitable sensors. The occupancy sensor 38 is in communication with the computer 32 via the communications network 34. Further, one or more occupancy sensors 38 may be included in the vehicle 30, and may provide data to the computer 32.

With reference to FIGS. 1 and 2, the vehicle 30 includes the external sensors 40. The external sensors 40 may detect the external world, i.e., the environment outside of the body of the vehicle 30. For example, the external sensors 40 may include radar sensors, scanning laser range finders, light detection and ranging (LIDAR) devices, and image processing sensors such as cameras.

Figure 3:
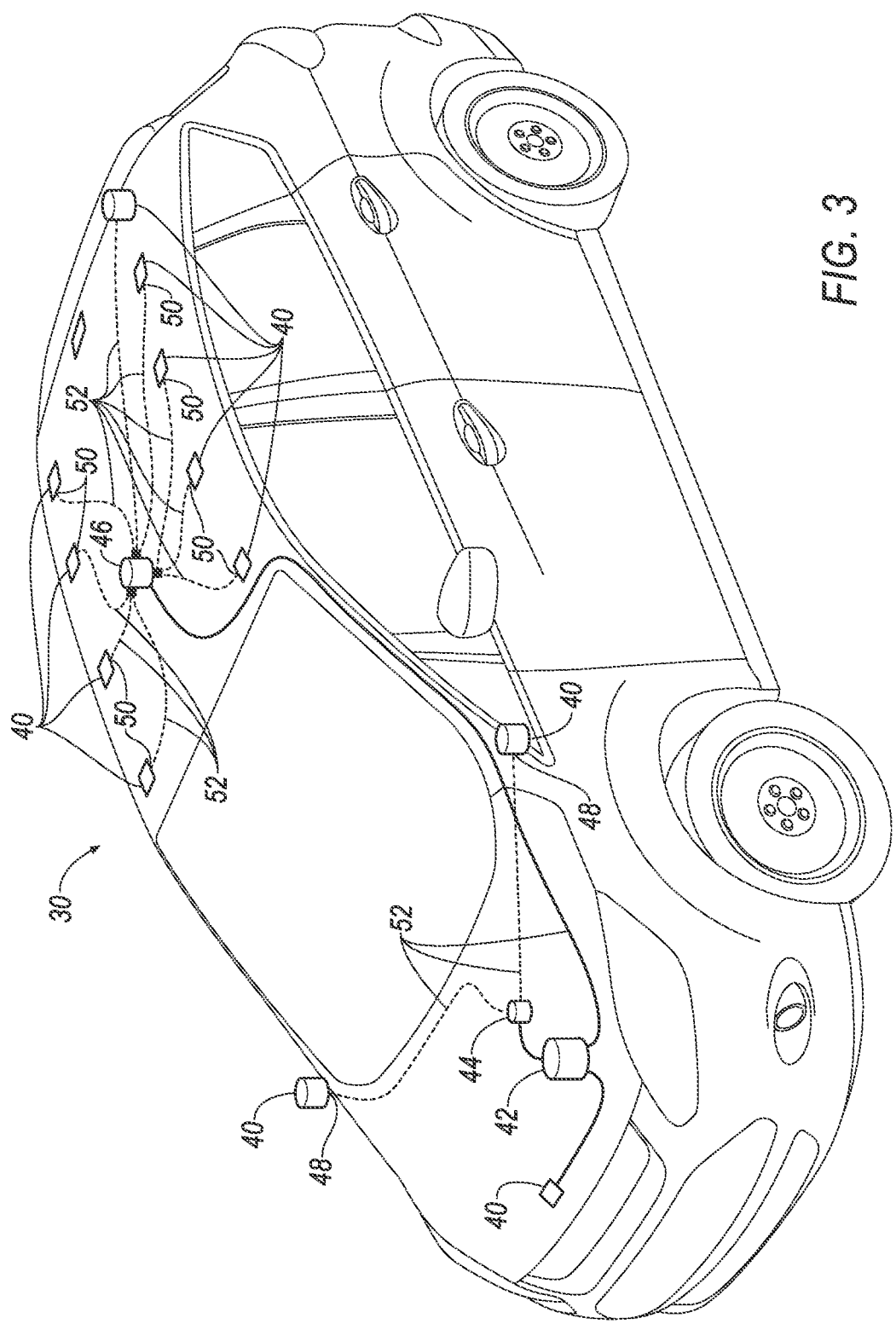
FIG. 3 is a diagram of an example cleaning system of the vehicle.

With reference to FIGS. 2 and 3, the compressor 42 increases the pressure of a gas by reducing a volume of the gas or by forcing additional gas into a constant volume. The compressor 42 may be disposed in a front end of the vehicle 30, specifically, in an engine compartment of the vehicle 30. The compressor 42 may be spaced from the passenger cabin. The compressor 42 may be any suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

With continued reference to FIGS. 2 and 3, the accumulators 44, 46 include a first accumulator 44 and a second accumulator 46, each fluidly connected with the compressor 42. (The adjectives "first" and "second" are used throughout this document as identifiers and are not intended to signify importance or order.) The vehicle 30 may include two accumulators 44, 46 or more than two accumulators. The first and second accumulators 44, 46 are spaced from each other. For example, the first accumulator 44 may be disposed in the engine compartment of the vehicle 30, and the second accumulator 46 may be disposed on a roof of the vehicle 30. The accumulators 44, 46 are passive, pressurized reservoirs for the gas compressed by the compressor 42.

With reference to FIG. 3, the nozzles 48, 50 include one or more first nozzles 48 and one or more second nozzles 50. The first nozzles 48 are each directed at one of a first subset of the external sensors 40 and fluidly connected with the first accumulator 44. The second nozzles 50 are each directed at one of a second subset of the external sensors 40 and fluidly connected to the second accumulator 46. The nozzles 48, 50 direct the flow of the compressed gas at the external sensors 40.

With continued reference to FIG. 3, supply lines 52 extend from the compressor 42 to the accumulators 44, 46 and from the accumulators 44, 46 to the nozzles 48, 50. The supply lines 52 may be, e.g., flexible tubes.

Figure 4:
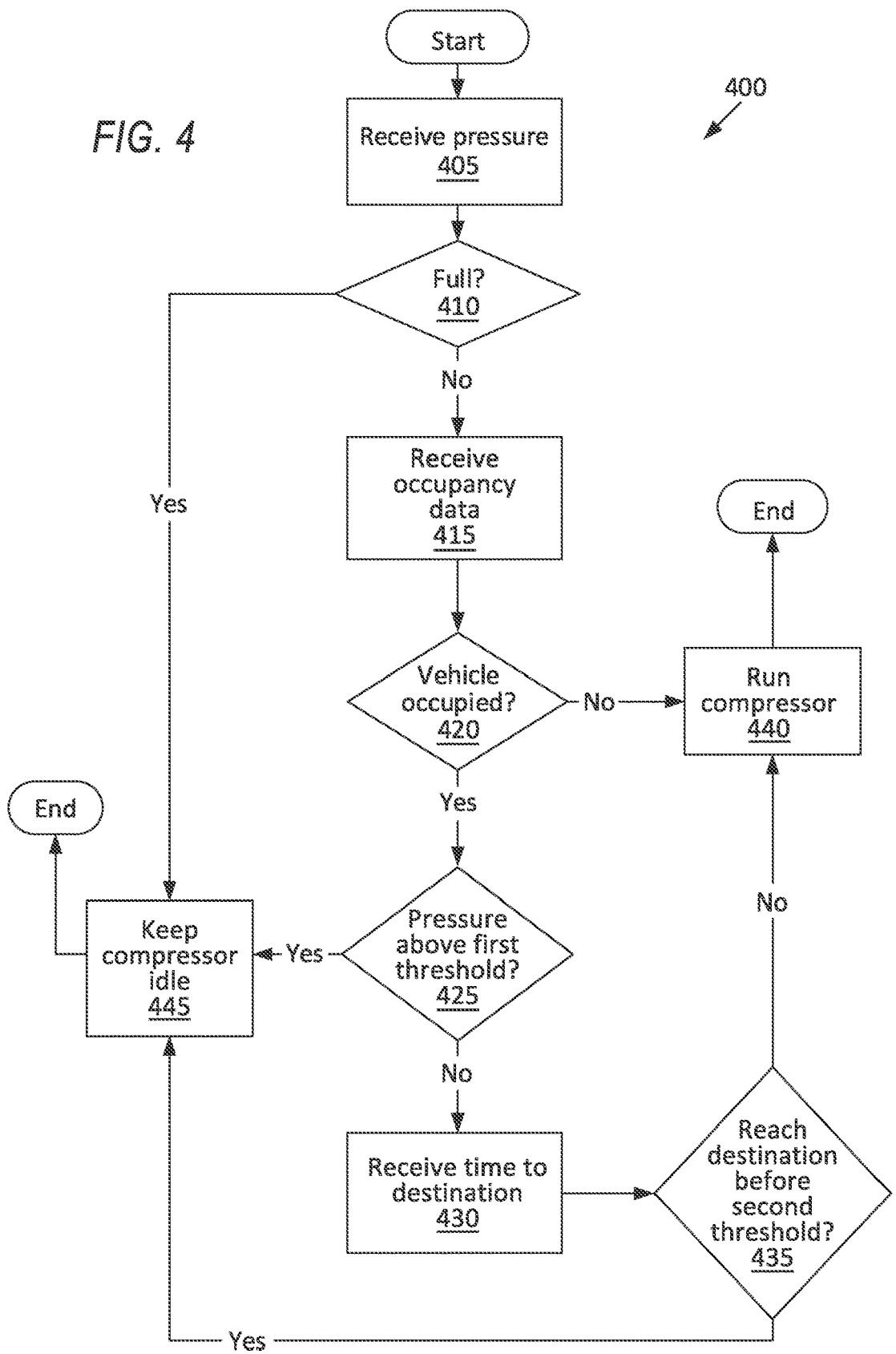
FIG. 4 is a process flow diagram of an example process for filling an accumulator of the cleaning system.

FIG. 4 is a process flow diagram illustrating an exemplary process 400 for filling the first or second accumulator 44, 46. The memory of the computer 32 stores programming for performing the steps of the process 400.

The process 400 begins in a block 405, in which the computer 32 receives an internal pressure of the compressed gas stored by one of the accumulators 44, 46.

Next, in a decision block 410, the computer 32 determines whether the accumulator 44, 46 is below a maximum pressure, that is, whether the compressed gas stored in the accumulator 44, 46 is below the maximum pressure. The maximum pressure may be a maximum pressure for which the accumulator 44, 46 is rated, e.g., by its manufacturer or supplier, to store compressed gas, e.g., in pounds per square inch (psi). If the accumulator 44, 46 is at or above the maximum pressure, the process 400 proceeds to a block 445.

If the accumulator 44, 46 is below the maximum pressure, next, in a block 415, the computer 32 receives data from the occupancy sensor 38, e.g., one or more digital images, data from a weight sensor disposed in a seat of the vehicle 30, etc.

Next, in a decision block 420, the computer 32 determines whether the vehicle 30 is occupied, that is, whether at least one occupant is present in the passenger cabin, based on the data received from the occupancy sensor 38. For example, the occupancy sensor 38 may provide data that one of the seatbelts is buckled or that a weight pressing on one of the seats is above a threshold weight. The threshold weight may be chosen to be heavy enough to avoid accidentally triggering and light enough that most occupants will trigger it, e.g., the weight of a 5th percentile female. If the vehicle 30 is unoccupied, the process 400 proceeds to a block 440.

If the vehicle 30 is occupied, next, in a decision block 425, the computer 32 determines whether the accumulator 44, 46 is above a threshold pressure. The threshold pressure is a preset value stored in the memory of the computer 32. The threshold pressure may be chosen by experiment and/or simulation so that the accumulator 44, 46 is unlikely to run out of compressed air within a standard travel distance, such as a distance of a 95th percentile commute. If the accumulator 44, 46 is above the threshold pressure, the process 400 proceeds to the block 445.

If the accumulator 44, 46 is below the pressure threshold, next, in a block 430, the computer 32 receives data including a duration, i.e., estimated time of travel from a current location, to a destination. The destination may be the destination that the vehicle 30 is autonomously traveling toward or the destination to which the computer 32 is providing navigation for a human driver of the vehicle 30. The destination is typically determined before the process 400 begins, e.g., by entry into a navigation system of the vehicle 30 or other input to the computer 32. The computer 32 may estimate a duration for the vehicle 30 to reach the destination based on estimating a time for navigating a route to the destination, as is known.

Next, in a decision block 435, the computer 32 determines whether the estimated duration for the vehicle 30 to travel to the preset destination is above a threshold time. The threshold time is calculated by the computer 32 based on the pressure of the accumulator 44, 46. The threshold time may be chosen by experiment and/or simulation so that the likelihood that the accumulator 44, 46 runs out of compressed gas is below, e.g., 50%. For example, the quantity of air vented from the accumulator 44, 46 over various trips under different driving conditions may be recorded, and an average rate of pressure reduction per unit time may be calculated. The average rate of pressure reduction would be preset in the memory of the computer 32. The threshold time would then be the pressure of the accumulator 44, 46 divided by the average rate of reduction. If the estimated duration is above the threshold time, the process 400 proceeds to the block 445.

If the estimated duration is below the threshold time, next, or if the vehicle 30 is unoccupied, after the decision block 420, in the block 440, the computer 32 instructs the compressor 42 to pressurize the accumulator 44, 46. The compressor 42 pressurizes the accumulator 44, 46 up to the maximum pressure. After the block 440, the process 400 ends.

If the accumulator 44, 46 is at the maximum pressure, after the decision block 410, if the accumulator 44, 46 is above the threshold pressure, after the decision block 425, or if the estimated duration is above the threshold time, after the decision block 435, in the block 445, the computer 32 instructs the compressor 42 to remain idle. The compressor 42 thus waits to fill the accumulator 44, 46 until, e.g., the vehicle 30 is no longer occupied or has reached the destination. After the block 445, the process 400 ends.

Figure 5:
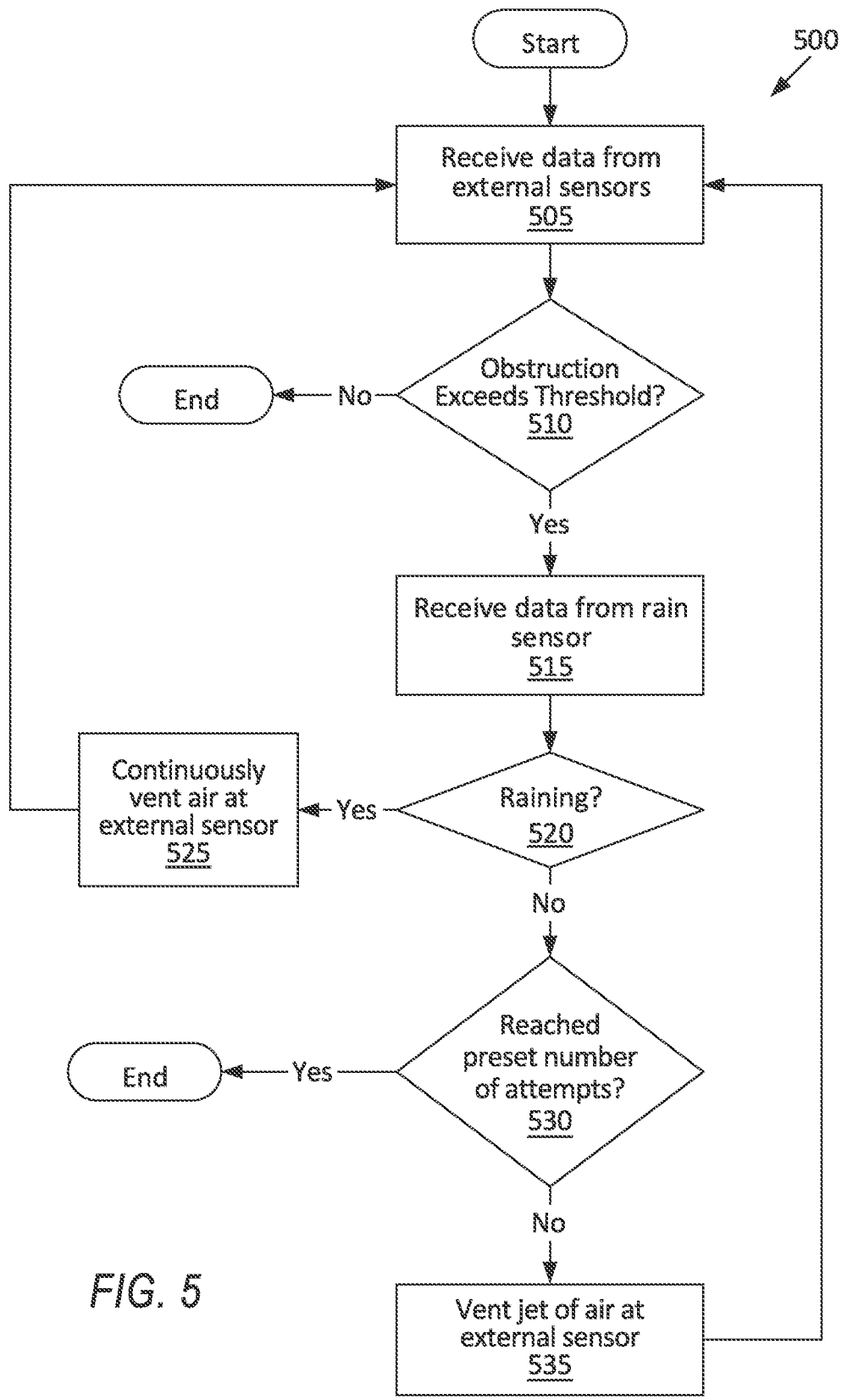
FIG. 5 is a process flow diagram of an example process for cleaning an external sensor of the vehicle.

FIG. 5 is a process flow diagram illustrating an exemplary process 500 for cleaning the external sensors 40 of the vehicle 30. The memory of the computer 32 stores programming for performing the steps of the process 500.

The process 500 begins in a block 505, in which the computer 32 receives data from the external sensors 40. The data includes data for determining an obstruction level for each of the external sensors 40. The obstruction level is a quantitative measure of how much of a field of view of the external sensor 40 is obstructed, that is, is blocked by dust, dirt, precipitation, insects, debris, etc. Obstructed portions of the field of view may be identified by, for example, comparing sequential images of the external sensor 40; the portions of the field of view that do not change between the sequential images while the vehicle 30 is in motion can be identified as obstructed, and the portions of the field of view that change can be identified as unobstructed. For another example, if the external sensor 40 is a radar or LIDAR, the obstructed portions of the field of view may be identified as the portions for which a distance of a detected object from the external sensor 40 is at or below a distance threshold. The distance threshold may be set as a distance from a receptor of the external sensor 40 to a lens or cover of the external sensor 40 (or the distance threshold may be set slightly higher to take into account measurement uncertainty of the external sensor 40). The obstruction level may be a proportion of the field of view of the external sensor 40 that is obstructed. The proportion of the field of view may be, e.g., a ratio of a total solid angle of the field of view that is obstructed to a solid angle of the entire field of view, or a ratio of a total obstructed area of an image (expressed in, e.g., pixels) detected by the external sensor 40 to the entire area of the image.

Next, in a decision block 510, the computer 32 determines the obstruction level for each external sensor 40 and determines whether any of the obstruction levels exceeds an external-sensor obstruction threshold. The external-sensor obstruction threshold may be preset and stored in the memory of the computer 32. The external-sensor obstruction threshold may be set by, e.g., experimentation or simulation to ensure reliable operation for the external sensor 40. For example, the external sensor 40 may be obstructed to a range of obstruction levels, the vehicle 30 may drive a course with the external sensor 40 at each of the obstructions levels of the range, and driving performances at the obstruction levels of the range are compared, or performances detecting objects and obstacles along the course are compared. If none of the obstructions of the external sensors 40 exceed the external-sensor obstruction threshold, the process 500 ends.

If one of the obstructions of the external sensors 40 exceeds the external-sensor obstruction threshold, next, in a block 515, the computer 32 receives data from the rain sensor 36.

Next, in a decision block 520, the computer 32 determines whether precipitation is above a precipitation threshold based on the data from the rain sensor 36. The precipitation threshold may be chosen based on experimentation to correspond to whether precipitation is occurring. For example, if the rain sensor 36 is a piezoelectric sensor, amplitude, frequency, or other vibration data may be recorded under various rainy and dry driving conditions, and the precipitation threshold may be chosen as a cutoff of the amplitude, frequency, or other vibration measures between the rainy conditions and the dry conditions. Alternatively, the precipitation threshold may be chosen to correspond to whether sufficient precipitation is occurring to cause an excessive obstruction level of one of external sensors 40. For example, if the rain sensor 36 is a piezoelectric sensor, amplitude, frequency, or other vibration data may be recorded under various rainy and dry driving conditions while also receiving data from the external sensor 40, and the precipitation threshold may be chosen as a cutoff of the amplitude, frequency, or other vibration measures between the obstruction level of the external sensor 40 being above and below the external-sensor obstruction threshold. If the precipitation is below the precipitation threshold, the process 500 proceeds to a decision block 530.

If the precipitation is above the precipitation threshold, next, in a block 525, the computer 32 instructs the accumulator 44, 46 to vent air through the nozzles 48, 50 directed at the external sensors 40. After the block 525, the process 500 returns to the block 505; thus, so long as the obstruction of one of the external sensors 40 exceeds the external-sensor obstruction threshold and the precipitation is above the precipitation threshold, the accumulator 44, 46 will continuously vent air at the external sensors 40.

If the precipitation is below the precipitation threshold, after the decision block 520, in the decision block 530, the computer 32 determines whether the computer 32 has reached a preset number of attempts to use the accumulator 44, 46. The preset number of attempts may be determined by experimentation to determine how many attempts of emitting air jets are needed to remove different types of obstructions. The preset number of attempts may be, e.g., five. The computer 32 compares the number of times that the computer 32 has executed the block 535 to the preset number of attempts. If the computer 32 has reached the preset number of attempts, the process 500 ends.

If the computer 32 has not yet reached the preset number of attempts, next, in the block 535, the computer 32 instructs the accumulator 44, 46 to vent an impulse of air through the nozzles 48, 50 directed at the external sensors 40. After the block 535, the process 500 returns to the block 505.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing processor-executable instructions, the processor programmed to:
   upon determining that a vehicle is unoccupied, instruct a compressor to pressurize an accumulator of the vehicle; and
   upon determining that the vehicle is occupied and that the accumulator is below a threshold pressure, instruct the compressor to pressurize the accumulator.

2. The computer of claim 1, further programmed to:
   upon determining that the vehicle is occupied, that an estimated duration for the vehicle to travel to a preset destination is below a threshold time, and that the accumulator is below the threshold pressure, instruct the compressor to remain idle.

3. The computer of claim 2, further programmed to:
   upon determining that the vehicle is occupied and that the accumulator is above the threshold pressure, instruct the compressor to remain idle.

4. The computer of claim 1, further programmed to:
   upon determining that an estimated distance for the vehicle to travel to a preset destination is below a threshold distance and that the accumulator is below the threshold pressure, instruct the compressor to remain idle.

5. The computer of claim 4, further programmed to:
   upon determining that the vehicle is occupied and that the accumulator is above the threshold pressure, instruct the compressor to remain idle.

6. The computer of claim 1, further programmed to:
   upon determining that obstruction of a sensor exceeds an obstruction threshold, instruct the accumulator to vent air through a nozzle directed at the sensor.

7. The computer of claim 1, wherein the accumulator is a first accumulator, and the computer is further programmed to: upon determining that no occupants are present in the vehicle, instruct the compressor to pressurize a second accumulator of the vehicle.

8. The computer of claim 1, further programmed to:
   upon determining that the vehicle is unoccupied and that the accumulator is below a maximum pressure, instruct the compressor to pressurize the accumulator.

9. A method comprising:
   upon determining that a vehicle is unoccupied, issuing an instruction to a compressor, the compressor pressurizing an accumulator of the vehicle as a result of receiving and executing the instruction; and
   upon determining that the vehicle is occupied and that the accumulator is below a threshold pressure, issuing an instruction to the compressor, the compressor pressurizing the accumulator as a result of receiving and executing the instruction.

10. The method of claim 9, further comprising:
    upon determining that the vehicle is occupied, that an estimated duration for the vehicle to travel to a preset destination is below a threshold time, and that the accumulator is below the threshold pressure, issuing an instruction to the compressor, the compressor remaining idle as a result of receiving and executing the instruction.

11. The method of claim 10, further comprising:
    upon determining that the vehicle is occupied and that the accumulator is above the threshold pressure, issuing an instruction to the compressor, the compressor remaining idle as a result of receiving and executing the instruction.

12. The method of claim 9, further comprising:
    upon determining that an estimated distance for the vehicle to travel to a preset destination is below a threshold distance and that the accumulator is below the threshold pressure, issuing an instruction to the compressor, the compressor remaining idle as a result of receiving and executing the instruction.

13. The method of claim 12, further comprising: upon determining that the vehicle is occupied and that the accumulator is above the threshold pressure, issuing an instruction to the compressor, the compressor remaining idle as a result of receiving and executing the instruction.

14. The method of claim 9, further comprising:
    upon determining that obstruction of a sensor exceeds an obstruction threshold, issuing an instruction to the accumulator, the accumulator venting air through a nozzle directed at the sensor as a result of receiving and executing the instruction.

15. The method of claim 9, wherein the accumulator is a first accumulator, the method further comprising; upon determining that no occupants are present in the vehicle, issuing an instruction to the compressor, the compressor pressurizing a second accumulator of the vehicle as a result of receiving and executing the instruction.

16. The method of claim 9, further comprising:
    upon determining that the vehicle is unoccupied and that the accumulator is below a maximum pressure, issuing an instruction to the compressor, the compressor pressurizing the accumulator as a result of receiving and executing the instruction.

17. A vehicle comprising:
    a compressor;
    a first accumulator fluidly connected with the compressor;

a second accumulator fluidly connected with the compressor;

a first nozzle directed at a first sensor and fluidly connected with the first accumulator;

a second nozzle directed at a second sensor and fluidly connected with the second accumulator;

an occupancy sensor; and a computer in communication with the compressor, the first accumulator, the second accumulator, and the occupancy sensor, wherein the computer is programmed to, upon determining that the vehicle is unoccupied based on data received from the occupancy sensor, instruct the compressor to pressurize the first accumulator and the second accumulator of the vehicle, and wherein the computer is further programmed to, upon determining that the vehicle is occupied and that the first accumulator is below a threshold pressure, instruct the compressor to pressurize the first accumulator.

18. The vehicle of claim 17, wherein the computer is further programmed to, upon determining that the vehicle is occupied and that the second accumulator is below the threshold pressure, instruct the compressor to pressurize the second accumulator.

* * * * *